United States Patent Office 3,167,138
Patented Jan. 26, 1965

3,167,138
METHOD FOR THE GRADING OF BANANAS
Henri Ignatius Humphries Slabbert, "Calais," District Letaba, Transvaal, Republic of South Africa (P.O. Box 1, Ofcolaco, Transvaal, Republic of South Africa)
Filed Apr. 12, 1962, Ser. No. 186,971
2 Claims. (Cl. 177—1)

The present invention relates to an improved method and means for the grading of bananas.

In accordance with a system hitherto generally employed, bananas are graded according to their dimensions, both the length and the circumference being taken into account.

This system of grading bananas has a number of disadvantages which render it undesirable. Should a banana, for example, have a circumference which is greater than that required for a certain grade, it can nonetheless fall into a lower grade if it has not got the requisite length. It is thus possible for a banana which is in all respects more desirable than another and which exceeds the other in circumference, though it is shorter than the other, to be graded into a lower grade than the longer banana.

Where unskilled labour is employed for the measuring of the bananas, the further disadvantage of inaccurate and unreliable measuring has to be contended with as the measuring is done by hand. As a result, rather than having their bananas graded down by an inspector or at the market, most producers make an allowance for a measuring error of up to 10%.

This 10% "undergrading" on the part of the producer represents a substantial loss of profits.

Inspectors in turn usually allow up to 10% undermeasuring. However, a few undersize bananas in a batch may nevertheless cause a whole consignment of otherwise highgrade bananas to be graded down, causing further losses. Losses of hundreds of dollars per annum are not uncommon among producers.

This method of grading is furthermore time-consuming and when vast quantities of bananas have to be graded this becomes an important factor. As a further consequence inaccuracy in the masuring often occurs due to the tempo of measuring which is necessary when vast quantities of bananas have to be graded in short periods.

Many inaccuracies in measuring also occur as a result of the personal factor which plays an important role. For example the circumference of the banana is not always measured at the thickest part of the banana, and in measuring the length, the longest distance between the extremities of the bananas is not always measured; furthermore, the measuring tape or cord is not always pulled to the same degree of tightness.

This is far from ideal, especially as the difference between the various grades of bananas is not very great. For example, according to a particular system of grading, the minimum length for large bananas is 7 inches and the minimum circumference is 4¾ inches, whilst the minimum length for medium grade bananas is 6½ inches and the minimum circumference is 4½ inches.

It is clear, therefore, that a small error in measuring, especially when already undergrading by 10%, can cause bananas, which should by rights belong to one grade, to be placed into a lower grade. Furthermore, if in a hand of say twenty bananas, quite a number of the bananas are large but the rest are small this is not sufficient to enable the entire hand to be classed as large, even if said large bananas are outsize.

The position is aggravated by the present ruling which states that a hand comprising less than 5 bananas may not be packed, so that the large bananas on a hand cannot be classed as large when the said large bananas are so interspaced with small ones that a second hand comprising at least 5 large bananas cannot be divided out of the said big hand containing large and small bananas.

It is an object of the present invention to overcome or mitigate the abovementioned difficulties both easily and effectively and to provide a method and means for the simple, accurate, and efficient grading of bananas.

The method of grading bananas in accordance with the invention comprises weighing a hand of bananas including the stem, dividing the weight or units obtained from the scale by the number of bananas on the hand in order to obtain the average weight of a banana and allotting said hand to one of various grades according to the average weight per banana so obtained.

The dehydration factor, which is dependent upon the length of time which has elapsed between the picking and the weighing of the bananas and also on the time of year when said bananas are picked, is preferably taken into account when weighing and grading bananas.

The stem on which the bananas grow and which is weighed together with the bananas, is preferably of a specified length for a set number of bananas, it having been found that the thickness of the stem is roughly proportional to the size of the bananas, and that the weight of the stem is only approximately 3% of the weight of the bananas so that any errors due to small differences in stem thickness are negligible.

The weight limits into which the bananas must fall for the various grades are preferably so chosen that they correspond as closely as possible to the grades into which said bananas would fall if they were to be graded by measurement of the length and circumference.

Taking the portion of stem to which the banana is affixed into consideration, it has been found that the average weight of one banana falling into the first grade of the aforesaid particular system of grading by dimensions is 3½ ounces or above, whilst the average weight of a banana falling into the second grade is between 2½ and 3½ ounces.

The means in accordance with the invention for weighing bananas for the purpose of grading comprises any suitable scale, the dial or other weight indicating means of which is divided into a series of divisions corresponding to the varying possible numbers of bananas on the different hands which have to be graded, each division being in turn subdivided into a number of units corresponding to the various grades for a specific number of bananas per hand represented by that division, the said divisions into which the scale is divided being multiples of the basic units for the various grades, e.g. multiples of 3½ ounces for the 1st grade and multiples of 2½ ounces for the second grade lower limits, according to the aforesaid particular system of grading, so that the grade into which a hand of bananas being weighed falls may be directly read off from the said scale.

In a particular embodiment of the invention the weight-indicating means of the scale comprises a rotatable drum, cylinder or the like, the length of which is divided into a number of circumferential columns each corresponding to a certain number of bananas on a hand, each column being subdivided into a number of units which are provided with suitable symbols or other indicatory marks to represent the various grades, said symbols or the like preferably forming rows which are substantially at right angles to the columns on the cylinder, drum or the like.

In one embodiment of the invention the symbols denoting the various grades are L for large, M for medium and S for small.

To further facilitate the easy reading off of the various grades of bananas the symbols representing the different grades may be provided in different colours, e.g. red for large, blue for medium and green for small or according to any other suitable arrangement.

In a preferred embodiment of the invention the units of a column corresponding to the various grades of the number of bananas represented by that column are provided in different colours, each colour thus denoting a certain grade, so that the grade into which a hand of bananas being weighed falls, may be ascertained merely by noting the colour of the relevant unit which is indicated on the dial or other weight indicating means.

Numerals showing the number of bananas to which the various columns correspond are preferably provided in the proximity of each column so that the grade for the particular number of bananas being weighed may be directly read off from the correct column.

In one embodiment of the invention the various columns on the rotatable drum, cylinder or the like of the scale are individually movable with respect to each other, so that the dehydration factor, which changes from time to time and from place to place, as well as the grading units, the standard of which also changes from time to time, may be set individually on the various columns.

Alternatively and preferably the rotatable drum, cylinder or the like of the scale may be provided with sets of two or more columns representing the various numbers of bananas per hand, the columns in each set being differently calibrated in order to provide for variations in the dehydration factor and/or in the standard of grading, so that for a certain dehydration factor and a certain standard of grading a certain column of a set will be used for grading a hand with a number of bananas corresponding to the set.

The scale may, if desired or required be so constructed that the various adjustments as regards standards of the various grades and also dehydration factors and the like can only be set by an inspector or a person having a similar authority, so as to ensure a standard grading throughout an area or even throughout a country.

In a preferred embodiment of the invention, one additional column is provided showing the weight of the bananas being weighed in pounds and ounces or other units of weight. If desired this may be used to set the various columns so that they give the correct reading as regards the grade of the bananas. A standard weight or set of weights may furthermore be provided for the purpose of setting the scale.

To ensure that the correct reading is made from the scale, i.e. that the reading is taken from the correct column corresponding to the number of bananas on the hand being weighed, and also from the correct column calibrated according to the dehydration factor and the standard of grading, a cursor may be provided, said cursor preferably being provided with an aperture or apertures or the like through which the symbol or other indicatory mark representing the particular grade in question may be seen, said cursor furthermore being slidable along the rows of symbols or other indicatory marks so that the symbol or symbols or the like of any desired column or combination of columns may appear in the aperture or apertures or the like in said cursor.

As no hand having less than five bananas may be packed and as the largest hands comprise no more than thirty bananas, columns representing from five to thirty bananas are preferably provided on the rotatable drum, cylinder or the like of the scale.

The invention and the manner in which it may be put into practice will now be further described by way of example with reference to the accompanying drawings, without thereby limiting the scope of the invention.

Figure 1:
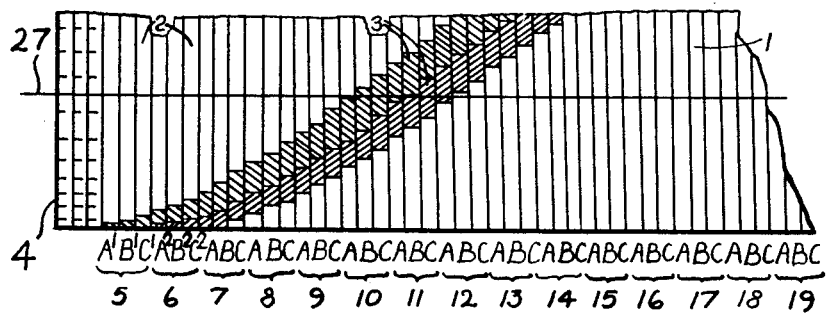
FIGURE 1 is a schematic representation of the scale layout on the rotatable cylinder of a scale in accordance with the invention.
Figure 2:
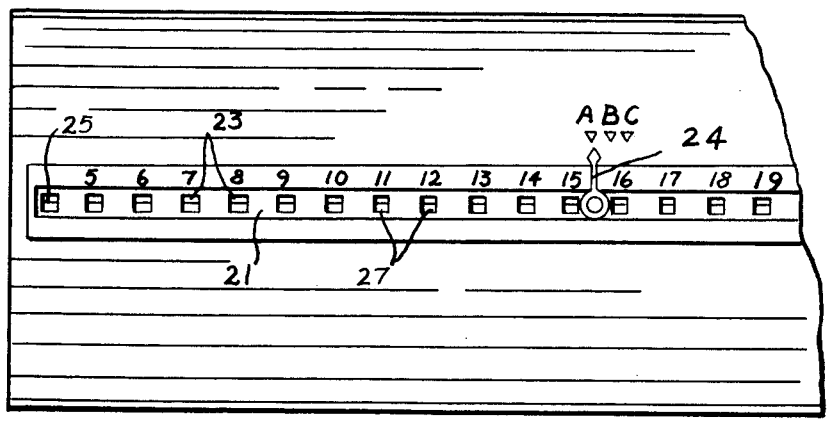
FIGURE 2 shows diagrammatically a slidable cursor provided on a scale in accordance with the invention.
Figure 3:
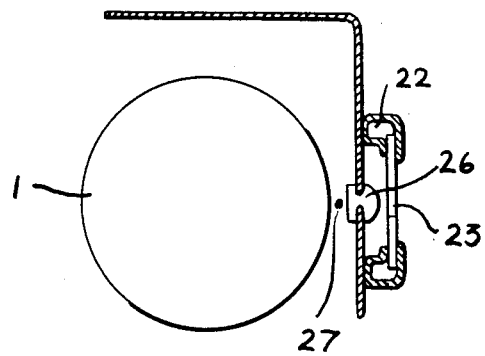
FIGURE 3 is a sectional side elevation of a portion of the scale shown in FIGURE 2 indicating the slidable cursor mounted on the scale casing.

Referring to the drawings, a scale for weighing bananas for the purpose of grading comprises a dial consisting of a rotatable cylinder 1 which is divided into a series of circumferential columns 2. The columns are grouped in sets of three, and each set of three columns A, B, C corresponds to a hand comprising a certain number of bananas.

For example, the set of three columns A1, B1, and C1 corresponds to and is used for grading a hand comprising five bananas; likewise the set of three columns A2, B2 and C2 corresponds to a hand with six bananas. Similarly sets of columns are provided to correspond to hands comprising 7 to 30 bananas.

Each column 2 is in turn calibrated in units 3, each unit corresponding to a certain grade for the number of bananas represented by that column 2.

In a set, columns A, B and C are differently calibrated in order to provide for varying dehydration factors and standards of grading. Therefore, for a certain dehydration factor and a certain standard of grading, column A of a set will be employed to grade the relevant hand of bananas, and under different dehydration conditions and grading standards either of columns B or C will be selected.

The units 3 of each column are provided in different colours, so that the grade into which a hand of bananas being weighed falls can be ascertained merely by noting the colour on the scale.

An additional column 4 is provided on the cylinder 1 which is calibrated in any known units of weight, e.g. pounds and ounces.

The scale is further provided with a cursor 21 which slides in a slot 22, said cursor 21 being provided with apertures 23 through which the calibrated dial 1 is visible. The cursor is further provided with a selector indicator 24, so that the desired grading combination, i.e. either columns A, or B or C, of each set, depending on the dehydration conditions and the standard of grading, can be effected by sliding the cursor 21 in the slot 22 until the selector indicator 24 points to the desired combination indicating symbol.

The column 4 is visible through aperture 25. A magnifying lens 26 is further positioned behind the cursor 21 for the purpose of facilitating the reading of the scale. A hair cord 27 enables the accurate reading of the scale.

In operation, a hand comprising say ten bananas which have to be graded is placed on the scale, the desired grading combination as indicated by the selector indicator 24 being selected by sliding the cursor 21 along the slot 22 until the desired combination of columns is visible through apertures 23, whereupon the grade of said bananas is ascertained by noting the colour of the unit which is visible through the aperture marked "1C" and which, therefore, corresponds to the column representing a hand comprising ten bananas.

What I claim is:
1. A method of grading a hand of bananas, comprising, placing a hand containing a fixed number of bananas upon a weighing unit having a drum rotatable to an extent proportional to the weight of a hand, said drum having a scale carrying discrete linearly-arranged sets of graduations corresponding to established grade qualities of bananas for a given number thereof in a hand, said unit also having a linearly-arranged series of viewing areas superimposed over said scale for viewing said graduations therethrough, each of said areas carrying an indicator co-acting with said scale and also carrying a reference to a hand holding a fixed but different number of bananas, taking a reading at a viewing area assigned to the specific number of bananas in said hand weighed, said reading consisting of the relative position of said indicator of said latter area with respect to the co-acting graduation on said scale, the reading being indicative of the grade quality of the banana hand weighed, and allocating said hand to an area assigned to such designated grade.

2. A method of grading a hand of bananas, comprising, placing a hand containing a fixed number of bananas upon a weighing unit having a drum rotatable to an extent proportional to the weight of a hand, said drum having a scale carrying discrete linearly-arranged sets of graduations corresponding to established grade qualities of bananas for a given number thereof in a hand, said unit also having a slide axially-movable with respect to said drum, and carrying a fixed pointer co-acting with a stationary quality-variation graduation on said unit, said slide also carrying a linearly-arranged series of viewing areas superimposed over said scale for viewing said graduations therethrough, each of said areas carrying an indicator co-acting with said scale, and also carrying a reference to a hand holding a fixed but different number of bananas, sliding said scale so that its pointer is disposed opposite the specific graduation on said unit associated with the predetermined quality variation of said hand, taking a reading at a viewing area assigned to the specific number of bananas in said hand weighed, said reading consisting of the relative position of said indicator of said latter areas with respect to the co-acting graduation on said scale, the reading being indicative of the grade quality of the banana hand weighed, and allocating said hand to an area assigned to such designated grade.

References Cited by the Examiner
UNITED STATES PATENTS

| | | | |
|---|---|---|---|
| 1,440,204 | 12/22 | Alschuler | 214—152 |
| 1,835,852 | 12/31 | Ehret | 177—38 |
| 1,855,928 | 4/32 | Sherer | 177—38 |
| 2,051,811 | 8/36 | Asmussen | 177—38 |
| 2,465,330 | 3/49 | Patterson | 177—38 |
| 2,633,970 | 4/53 | Robinson | 198—19 |
| 2,910,036 | 10/59 | Lasko | 116—57 |
| 3,037,476 | 6/62 | Nallinger | 116—57 |
| 3,088,432 | 5/63 | Nallinger | 116—116 |

LEO SMILOW, *Primary Examiner.*

LEYLAND M. MARTIN, *Examiner.*